US009298012B2

(12) United States Patent
Bohn et al.

(10) Patent No.: US 9,298,012 B2
(45) Date of Patent: *Mar. 29, 2016

(54) EYEBOX ADJUSTMENT FOR INTERPUPILLARY DISTANCE

(71) Applicant: Microsoft Technology Licensing, LLC, Redmond, WA (US)

(72) Inventors: David D. Bohn, Fort Collins, CO (US); Rod G. Fleck, Bellevue, WA (US); Steven John Robbins, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/134,993

(22) Filed: Dec. 19, 2013

(65) Prior Publication Data
US 2014/0104685 A1    Apr. 17, 2014

Related U.S. Application Data

(63) Continuation of application No. 13/343,675, filed on Jan. 4, 2012, now Pat. No. 8,638,498.

(51) Int. Cl.
*G02B 27/22* (2006.01)
*G02B 7/12* (2006.01)

(52) U.S. Cl.
CPC .............. *G02B 27/2242* (2013.01); *G02B 7/12* (2013.01)

(58) Field of Classification Search
CPC .... G02B 27/0103; G02B 7/002; G02B 23/18; G02B 7/06; G02B 27/0172; G02B 27/0149; G02B 27/0101; G02B 27/017; G02B 25/00; G02B 27/22; A61B 3/111; A61B 3/113; G02C 13/005; G09G 3/003

USPC ........... 359/13, 411–418, 473, 481, 630–633; 345/7, 8, 9; 351/204, 210
See application file for complete search history.

(56) References Cited

U.S. PATENT DOCUMENTS 3,971,065 A    7/1976  Bayer
5,252,950 A    10/1993  Saunders et al.
(Continued)

FOREIGN PATENT DOCUMENTS

CN    1440513    9/2003
CN    1469700    1/2004
(Continued)

OTHER PUBLICATIONS

"HDTV Helmet Mounted Display", Available at <http://defense-update.com/products/h/HDTV-HMD.htm>,(Jan. 26, 2005), 1 page.
(Continued)

*Primary Examiner* — Thomas K Pham
*Assistant Examiner* — Jie Lei
(74) *Attorney, Agent, or Firm* — Micah Goldsmith; Judy Yee; Micky Minhas

(57) ABSTRACT

In embodiments of eyebox adjustment for interpupillary distance, a first optical lens receives light of an image at a projected orientation of the light, and deviates the light by a deviation angle from the projected orientation of the light. A second optical lens receives the deviated light of the image from the first optical lens at the deviation angle, and alters the deviated light back to the projected orientation of the light for viewing the image. Left and right eyeboxes align with respective left and right eyes that view the image, and a distance between the left and right eyeboxes approximately correlates to an interpupillary distance between the left and right eyes. The light of the image can be laterally shifted to increase or decrease the distance between the left and right eyeboxes.

20 Claims, 6 Drawing Sheets

(56) References Cited

U.S. PATENT DOCUMENTS

| | | |
|---|---|---|
| 5,309,169 A | 5/1994 | Leppert |
| 5,359,444 A | 10/1994 | Piosenka et al. |
| 5,455,882 A | 10/1995 | Veligdan |
| 5,459,611 A | 10/1995 | Bohn et al. |
| 5,483,307 A | 1/1996 | Anderson |
| 5,574,473 A | 11/1996 | Sekiguchi |
| 5,583,609 A | 12/1996 | Mizutani et al. |
| 5,614,941 A | 3/1997 | Hines |
| 5,648,643 A | 7/1997 | Knowles et al. |
| 5,673,146 A | 9/1997 | Kelly |
| 5,708,449 A | 1/1998 | Heacock et al. |
| 5,714,967 A | 2/1998 | Okamura et al. |
| 5,751,476 A | 5/1998 | Matsui et al. |
| 5,982,553 A | 11/1999 | Bloom et al. |
| 6,101,008 A | 8/2000 | Popovich |
| 6,160,667 A | 12/2000 | Smoot |
| 6,188,427 B1 | 2/2001 | Anderson et al. |
| 6,271,808 B1 | 8/2001 | Corbin |
| 6,377,401 B1 | 4/2002 | Bartlett |
| 6,496,218 B2 | 12/2002 | Takigawa et al. |
| 6,529,331 B2 | 3/2003 | Massof et al. |
| 6,554,428 B2 | 4/2003 | Fergason et al. |
| 6,577,411 B1 | 6/2003 | David |
| 6,639,201 B2 | 10/2003 | Almogy et al. |
| 6,702,003 B2 | 3/2004 | Hsiao et al. |
| 6,753,828 B2 | 6/2004 | Tuceryan et al. |
| 6,775,460 B2 | 8/2004 | Steiner et al. |
| 6,829,095 B2 | 12/2004 | Amitai |
| 6,867,753 B2 | 3/2005 | Chinthammit et al. |
| 6,919,867 B2 | 7/2005 | Sauer |
| 6,947,020 B2 | 9/2005 | Kiser et al. |
| 6,964,731 B1 | 11/2005 | Krisko et al. |
| 7,015,876 B1 | 3/2006 | Miller |
| 7,048,385 B2 | 5/2006 | Beeson et al. |
| 7,193,584 B2 | 3/2007 | Lee et al. |
| 7,359,420 B2 | 4/2008 | Shchegrov et al. |
| 7,369,101 B2 | 5/2008 | Sauer et al. |
| 7,417,617 B2 | 8/2008 | Eichenlaub |
| 7,430,349 B2 | 9/2008 | Jones |
| 7,430,355 B2 | 9/2008 | Heikenfeld et al. |
| 7,542,665 B2 | 6/2009 | Lei |
| 7,660,500 B2 | 2/2010 | Konttinen et al. |
| 7,777,944 B2 | 8/2010 | Ho et al. |
| 7,986,462 B2 | 7/2011 | Kobayashi et al. |
| 8,446,340 B2 | 5/2013 | Aharoni |
| 8,638,498 B2 * | 1/2014 | Bohn et al. .................. 359/481 |
| 8,666,212 B1 | 3/2014 | Amirparviz |
| 8,770,813 B2 | 7/2014 | Bohn et al. |
| 8,810,600 B2 | 8/2014 | Bohn et al. |
| 8,854,802 B2 | 10/2014 | Robinson et al. |
| 8,917,453 B2 | 12/2014 | Bohn |
| 9,052,414 B2 | 6/2015 | Travis et al. |
| 9,223,138 B2 | 12/2015 | Bohn |
| 2001/0043208 A1 | 11/2001 | Furness, III et al. |
| 2002/0171939 A1 | 11/2002 | Song |
| 2003/0000689 A1 | 1/2003 | Kuo et al. |
| 2003/0006364 A1 | 1/2003 | Katzir et al. |
| 2003/0137706 A1 | 7/2003 | Rmanujam et al. |
| 2003/0179453 A1 | 9/2003 | Mori et al. |
| 2004/0085649 A1 | 5/2004 | Repetto et al. |
| 2004/0135209 A1 | 7/2004 | Hsieh et al. |
| 2004/0195963 A1 | 10/2004 | Choi et al. |
| 2005/0225233 A1 | 10/2005 | Boroson et al. |
| 2005/0243107 A1 | 11/2005 | Haim et al. |
| 2006/0018025 A1 | 1/2006 | Sharon et al. |
| 2006/0038881 A1 | 2/2006 | Starkweather et al. |
| 2006/0044399 A1 | 3/2006 | Fredlund et al. |
| 2006/0054787 A1 | 3/2006 | Olsen et al. |
| 2006/0072206 A1 * | 4/2006 | Tsuyuki et al. ............... 359/631 |
| 2006/0139447 A1 | 6/2006 | Unkrich |
| 2006/0249765 A1 | 11/2006 | Hsieh |
| 2007/0023703 A1 | 2/2007 | Sunaoshi et al. |
| 2007/0147673 A1 | 6/2007 | Crandall |
| 2007/0177260 A1 | 8/2007 | Kuppenheimer et al. |
| 2008/0043100 A1 | 2/2008 | Sobel et al. |
| 2008/0311386 A1 | 12/2008 | Wendt |
| 2009/0051283 A1 | 2/2009 | Cok et al. |
| 2009/0128901 A1 | 5/2009 | Tilleman et al. |
| 2009/0190003 A1 | 7/2009 | Park et al. |
| 2009/0246707 A1 | 10/2009 | Li et al. |
| 2010/0053151 A1 | 3/2010 | Marti et al. |
| 2010/0060551 A1 | 3/2010 | Sugiyama et al. |
| 2010/0061078 A1 | 3/2010 | Kim |
| 2010/0084674 A1 | 4/2010 | Paetzold et al. |
| 2010/0103078 A1 | 4/2010 | Mukawa et al. |
| 2010/0141905 A1 | 6/2010 | Burke |
| 2010/0149073 A1 | 6/2010 | Chaum et al. |
| 2010/0213467 A1 | 8/2010 | Lee et al. |
| 2010/0229853 A1 | 9/2010 | Vandal et al. |
| 2010/0238270 A1 | 9/2010 | Bjelkhagen et al. |
| 2010/0238664 A1 | 9/2010 | Steenbergen |
| 2010/0245387 A1 | 9/2010 | Bachelder et al. |
| 2010/0281439 A1 | 11/2010 | Markovic et al. |
| 2010/0317132 A1 | 12/2010 | Rogers et al. |
| 2011/0012814 A1 | 1/2011 | Tanaka |
| 2011/0021251 A1 | 1/2011 | Lindén |
| 2011/0032482 A1 | 2/2011 | Agurok |
| 2011/0050655 A1 | 3/2011 | Mukawa |
| 2011/0051660 A1 | 3/2011 | Arora et al. |
| 2011/0090343 A1 | 4/2011 | Alt et al. |
| 2011/0091156 A1 | 4/2011 | Laughlin |
| 2011/0114823 A1 | 5/2011 | Katzir et al. |
| 2011/0194029 A1 | 8/2011 | Herrmann et al. |
| 2011/0221659 A1 | 9/2011 | King et al. |
| 2011/0227913 A1 | 9/2011 | Hyndman |
| 2011/0242145 A1 | 10/2011 | Nishimura et al. |
| 2011/0242392 A1 | 10/2011 | Chiang |
| 2011/0248904 A1 | 10/2011 | Miyawaki et al. |
| 2011/0267799 A1 | 11/2011 | Epstein et al. |
| 2011/0299044 A1 | 12/2011 | Yeh et al. |
| 2011/0309378 A1 | 12/2011 | Lau et al. |
| 2012/0026161 A1 | 2/2012 | Chen et al. |
| 2012/0102438 A1 | 4/2012 | Robinson et al. |
| 2012/0106170 A1 | 5/2012 | Matthews et al. |
| 2012/0113092 A1 | 5/2012 | Bar-Zeev et al. |
| 2012/0162764 A1 | 6/2012 | Shimizu |
| 2012/0200495 A1 | 8/2012 | Johansson |
| 2012/0206589 A1 | 8/2012 | Crandall |
| 2012/0242798 A1 | 9/2012 | Mcardle et al. |
| 2012/0292535 A1 | 11/2012 | Choi et al. |
| 2013/0027772 A1 | 1/2013 | Large |
| 2013/0093741 A1 | 4/2013 | Akimoto et al. |
| 2013/0162673 A1 | 6/2013 | Bohn |
| 2013/0163089 A1 | 6/2013 | Bohn |
| 2013/0170031 A1 | 7/2013 | Bohn |
| 2013/0187943 A1 | 7/2013 | Bohn et al. |
| 2013/0201285 A1 | 8/2013 | Mao et al. |
| 2013/0207964 A1 | 8/2013 | Fleck |
| 2013/0208003 A1 | 8/2013 | Bohn |
| 2013/0208362 A1 | 8/2013 | Bohn |
| 2013/0208482 A1 | 8/2013 | Fleck |
| 2013/0342674 A1 | 12/2013 | Dixon |
| 2014/0078130 A1 | 3/2014 | Uchino et al. |
| 2015/0168731 A1 | 6/2015 | Robbins |
| 2015/0227231 A1 | 8/2015 | Chen |

FOREIGN PATENT DOCUMENTS

| | | |
|---|---|---|
| CN | 101193535 | 6/2008 |
| CN | 101917835 | 12/2010 |
| CN | 102004315 | 4/2011 |
| EP | 1391673 | 8/2003 |
| EP | 1482396 | 3/2004 |
| JP | 7311303 | 11/1995 |
| JP | 2001078234 | 3/2001 |
| JP | 2008017135 | 1/2008 |
| KR | 20090076539 | 7/2009 |
| WO | WO-9418595 | 8/1994 |
| WO | WO-0195027 | 12/2001 |

(56) References Cited

FOREIGN PATENT DOCUMENTS

| WO | WO-03090611 | 11/2003 |
|---|---|---|
| WO | WO-2009143330 | 11/2009 |
| WO | WO-2011051660 | 5/2011 |

OTHER PUBLICATIONS

"International Search Report and Written Opinion", Application No. PCT/US2012/069330, (Mar. 28, 2013), 9 pages.
"Non-Final Office Action", U.S. Appl. No. 13/397,495, (Nov. 13, 2013), 8 pages.
"Non-Final Office Action", U.S. Appl. No. 13/336,895, (Oct. 24, 2013), 9 pages.
"Non-Final Office Action", U.S. Appl. No. 13/343,675, (Jul. 16, 2013), 9 pages.
"Non-Final Office Action", U.S. Appl. No. 13/397,516, (Nov. 25, 2013), 10 pages.
"Notice of Allowance", U.S. Appl.No. 13/343,675, (Sep. 16, 2013), 8 pages.
"PCT Search Report and Written Opinion", Application No. PCT/US2012/069331, (Mar. 29, 2013), 10 pages.
"PCT Search Report and Written Opinion", Application No. PCT/US2013/026200, (Jun. 3, 2013), 9 pages.
"PCT Search Report and Written Opinion", Application No. PCT/US2012/071563, (Apr. 25, 2013), 13 pages.
Allen, Steven C., "ELiXiR—Solid-State Luminaire with Enhanced Light Extraction by Internal Reflection", *Journal of Display Technology*, vol. 3, No. 2, Available at <http://www.nanolab.uc.edu/Publications/PDFfiles/355.pdf>,(Jun. 2007), pp. 155-159.
Baluja, Shumeet et al., "Non-Intrusive Gaze Tracking Using Artificial Neural Networks", *Technical Report CMU-CS-94-102*, Available at <http://citeseerx.ist.psu.edu/viewdoc/download?doi=10.1.1.33.4027&rep=rep1&type=pdf> ,(Jan. 5, 1994), 14 pages.
Cheng, Yu-Hsiang et al., "Waveguide Displays Based on Polymer-dispersed Liquid Crystals", *SPIE Newsroom*, Available at <http://spie.org/documents/Newsroom/Imported/003805/003805_10.pdf>, (Aug. 12, 2011), 2 pages.
Karp, Jason H., et al., "Planar Micro-optic Solar Concentration using Multiple Imaging Lenses into a Common Slab Waveguide", *In Proceedings of SPIE vol. 7407*, Available at <http://psilab.ucsd.edu/research/slab_concentration/files/SPIE_Slab_Published.pdf>,(Jan. 2009), 11 pages.
Singh Brar, Rajwinder et al., "Laser-Based Head-Tracked 3D Display Research", *Journal of Display Technology*, vol. 6, No. 10, Available at <http://ieeexplore.ieee.org/stamp/stamp.jsp?tp=&arnumber=5462999>,(Oct. 2010), pp. 531-543.
"Final Office Action", U.S. Appl. No. 13/397,495, May 29, 2014, 10 pages.
"Final Office Action", U.S. Appl. No. 13/336,895, May 27, 2014, 11 pages.
"Notice of Allowance", U.S. Appl. No. 13/356,545, Mar. 28, 2014, 6 pages.
"Foreign Office Action", CN Application No. 201210567932.5, Aug. 14, 2014, 12 pages.
"Non-Final Office Action", U.S. Appl. No. 13/397,617, Oct. 9, 2014, 6 pages.
"Restriction Requirement", U.S. Appl. No. 13/397,539, Dec. 1, 2014, 6 pages.
"Non-Final Office Action", U.S. Appl. No. 13/336,873, Jul. 25, 2014, 16 pages.
"Non-Final Office Action", U.S. Appl. No. 13/397,516, Jun. 12, 2014, 11 pages.
"Notice of Allowance", U.S. Appl. No. 13/336,895, Aug. 11, 2014, 6 pages.
"Supplemental Notice of Allowance", U.S. Appl. No. 13/356,545, Jul. 22, 2014, 2 pages.
"Corrected Notice of Allowance", U.S. Appl. No. 13/336,873, Sep. 11, 2015, 4 pages.
"Extended European Search Report", EP Application No. 13741406.6, Aug. 21, 2015, 7 pages.
"Final Office Action", U.S. Appl. No. 13/440,165, Jul. 21, 2015, 11 pages.
"Final Office Action", U.S. Appl. No. 13/722,917, Sep. 23, 2015, 14 pages.
"Final Office Action", U.S. Appl. No. 14/178,731, Aug. 12, 2015, 13 pages.
"Foreign Office Action", CN Application No. 201210563730.3, Aug. 14, 2015, 4 Pages.
"Foreign Office Action", CN Application No. 201310024146.5, Sep. 6, 2015, 12 pages.
"Foreign Office Action", EP Application No. 13765041.2, Aug. 5, 2015, 6 pages.
"Foreign Office Action", EP Application No. 13770174.4, Jul. 1, 2015, 6 pages.
"Non-Final Office Action", U.S. Appl. No. 13/397,516, Sep. 24, 2015, 14 pages.
"Restriction Requirement", U.S. Appl. No. 13/420,388, Aug. 13, 2015, 6 pages.
"Final Office Action", U.S. Appl. No. 13/397,539, Jun. 29, 2015, 11 pages.
"Final Office Action", U.S. Appl. No. 13/774,875, Jun. 4, 2015, 10 pages.
"Foreign Office Action", EP Application No. 13769961.7, Jun. 30, 2015, 6 pages.
"Non-Final Office Action", U.S. Appl. No. 13/355,914, Jun. 2, 2015, 19 pages.
"Non-Final Office Action", U.S. Appl. No. 13/397,617, May 5, 2015, 6 pages.
"Non-Final Office Action", U.S. Appl. No. 13/428,879, Jun. 26, 2015, 13 pages.
"Non-Final Office Action", U.S. Appl. No. 13/432,311, Jun. 2, 2015, 25 pages.
"Non-Final Office Action", U.S. Appl. No. 13/477,646, Jun. 18, 2015, 43 pages.
"Non-Final Office Action", U.S. Appl. No. 13/722,917, May 21, 2015, 12 pages.
"Supplementary European Search Report", EP Application No. 13765041.2, Jul. 21, 2015, 3 pages.
"Corrected Notice of Allowance", U.S. Appl. No. 13/336,873, Nov. 27, 2015, 4 pages.
"Final Office Action", U.S. Appl. No. 13/355,914, Oct. 19, 2015, 17 pages.
"Final Office Action", U.S. Appl. No. 13/397,617, Nov. 18, 2015, 11 pages.
"Final Office Action", U.S. Appl. No. 13/477,646, Nov. 24, 2015, 39 pages.
"Foreign Notice of Allowance", CN Application No. 201210563730.3, Nov. 30, 2015, 4 Pages.
"International Search Report and Written Opinion", U.S. Appl. No. PCT/US2015/041900, Oct. 21, 2015, 12 pages.
"International Search Report and Written Opinion", U.S. Appl. No. PCT/US2015/041909, Oct. 20, 2015, 13 pages.
"Non-Final Office Action", U.S. Appl. No. 13/397,539, Oct. 1, 2015, 12 pages.
"Non-Final Office Action", U.S. Appl. No. 13/420,388, Dec. 4, 2015, 7 pages.
"Non-Final Office Action", U.S. Appl. No. 13/774,875, Sep. 16, 2015, 8 pages.
"Notice of Allowance", U.S. Appl. No. 13/397,495, Oct. 20, 2015, 6 pages.
Ando,"Development of Three-Dimensional Microstages Using Inclined Deep-Reactive Ion Etching", Journal of Microelectromechanical Systems, Jun. 1, 2007, 10 pages.
Gila,"First Results From A Multi-Ion Beam Lithography And Processing System At The University Of Florida", AIP Conference Proceedings, Jun. 1, 2011, 6 pages.
"Final Office Action", U.S. Appl. No. 13/428,879, Dec. 10, 2015, 16 pages.
"Final Office Action", U.S. Appl. No. 13/432,311, Dec. 18, 2015, 9 pages.
"Non-Final Office Action", U.S. Appl. No. 13/722,917, Feb. 9, 2016, 17 pages.
"Notice of Allowance", U.S. Appl. No. 13/397,516, Feb. 1, 2016, 7 pages.
"Supplemental Notice of Allowance", U.S. Appl. No. 13/397,495, Jan. 26, 2016, 4 pages.
"Supplemental Notice of Allowance", U.S. Appl. No. 14/447,464, Jan. 12, 2016, 2 pages.

* cited by examiner

EYEBOX ADJUSTMENT FOR INTERPUPILLARY DISTANCE

RELATED APPLICATION

This application is a continuation of and claims priority to U.S. patent application Ser. No. 13/343,675 filed Jan. 4, 2012 entitled "Eyebox Adjustment for Interpupillary Distance", the disclosure of which is incorporated by reference herein in its entirety.

BACKGROUND

Virtual reality can be viewed as a computer-generated simulated environment in which a user has an apparent physical presence. A virtual reality experience can be generated in 3D and viewed with a head-mounted display (HMD), such as glasses or other wearable display device that has near-eye display panels as lenses to display a virtual reality environment, which replaces the actual environment. Augmented reality, however, provides that a user can still see through the display lenses of the glasses or other wearable display device to view the surrounding environment, yet also see images of virtual objects that are generated for display and appear as a part of the environment. Augmented reality can include any type of input such as audio and haptic inputs, as well as virtual images, graphics, and video that enhances or augments the environment that a user experiences. As an emerging technology, there are many challenges and design constraints with augmented reality, from generation of the virtual objects and images so that they appear realistic in a real environment, to developing the optics small and precise enough for implementation with a wearable display device.

A challenge to the implementation of wearable display devices, such as a head-mounted display (HMD), for virtual and/or augmented reality is that one size does not fit all users. Just as typical users come in all shapes and sizes, so is the interpupillary distance between different users' pupils of their eyes. Additionally, the distance from a user's nose to the pupil of one eye may be different than the distance from the user's nose to the pupil of the other eye. For binocular viewing systems, such as a wearable display device, the right and left display lens systems have a small lateral margin to approximately center a user's eyes on the optical axis of the display lens systems. This small lateral margin of adjustment for varying interpupillary distances is commonly referred to as the eyebox for a display lens system, and the eyebox represents the range within which a user's eye should be positioned for viewing with a wearable display device. Some conventional systems attempt to compensate for the uniqueness of different users with a mechanical adjustment system, which is then a wearable display device that fits only one person. Another compensation technique is to oversize the eyebox for a general, one-size-fits all approach. However, this is largely cost-prohibitive due to the expensive optical systems in wearable display devices. Additionally, the one-size-fits all approach to oversize the eyebox results in a very large and heavy optical system, which is also impractical for consumer head-mounted display systems.

SUMMARY

This Summary introduces simplified concepts of eyebox adjustment for interpupillary distance, and the concepts are further described below in the Detailed Description and/or shown in the Figures. This Summary should not be considered to describe essential features of the claimed subject matter, nor used to determine or limit the scope of the claimed subject matter.

Eyebox adjustment for interpupillary distance is described. In embodiments, a first optical lens receives light of an image from a display optic at a projected orientation of the light, and the first optical lens can deviate the light of the image by a deviation angle from the projected orientation of the light. A second optical lens receives the light of the image from the first optical lens at the deviation angle, and the second optical lens alters the deviated light of the image back to the projected orientation of the light for viewing the image. Left and right eyeboxes align with respective left and right eyes that view the image, and a distance between the left and right eyeboxes approximately correlates to an interpupillary distance between the left and right eyes. The light of the image can be laterally shifted to increase or decrease the distance between the left and right eyeboxes.

In other embodiments, the light of the image is laterally shifted based on the deviation angle and a distance between the first optical lens and the second optical lens. Designated position settings of the left and right eyeboxes can be implemented for viewing the image. In a first position, the distance between the left and right eyeboxes is increased to correlate to a wide interpupillary distance between the left and right eyes. In a second position, the distance between the left and right eyeboxes is not laterally shifted when the first optical lens projects the light of the image through at the projected orientation of the light. In a third position, the distance between the left and right eyeboxes is decreased to correlate to a narrow interpupillary distance between the left and right eyes.

In other embodiments, the first optical lens can be implemented for on-off control, where the first and third positions are enabled when the first optical lens is turned-on, and the second position is enabled when the first optical lens is turned-off. Alternatively, the first optical lens can be implemented for variable control of the position settings to vary the distance between the left and right eyeboxes to correlate with the interpupillary distance between the left and right eyes. In an implementation, an eye-tracking camera is implemented to image a location of the left and right eyes, and the distance between the left and right eyeboxes is adjusted based on the location of the left and right eyes. In another implementation, the distance between the left and right eyeboxes is based on a user input of the interpupillary distance between the left and right eyes.

BRIEF DESCRIPTION OF THE DRAWINGS

Embodiments of eyebox adjustment for interpupillary distance are described with reference to the following Figures. The same numbers may be used throughout to reference like features and components that are shown in the Figures.

DETAILED DESCRIPTION

Embodiments of eyebox adjustment for interpupillary distance are described. As noted above, a challenge to the implementation of wearable display devices, such as a head-mounted display (HMD), for virtual and/or augmented reality is that one size does not fit all users due to the interpupillary distance between different users' pupils of their eyes. For binocular viewing systems, such as a wearable display device (e.g., glasses or a head-mounted display), the right and left display lens systems have an eyebox that is the range within which a user's eye should be positioned for viewing with a wearable display device.

Embodiments of eyebox adjustment for interpupillary distance provides that the eyeboxes for the display lens systems of a wearable display device can be laterally adjusted to accommodate different users. A wearable display device can be implemented for designated position settings of the left and right eyeboxes, such as a first position that correlates to a wide interpupillary distance between the left and right eyes, a second position that correlates to a mid-interpupillary distance between the left and right eyes, and a third position that correlates to a narrow interpupillary distance between the left and right eyes. Alternatively, a wearable display device can be implemented for variable control of position settings to vary the distance between the left and right eyeboxes to correlate with the interpupillary distance between the left and right eyes of a user.

While features and concepts of eyebox adjustment for interpupillary distance can be implemented in any number of different devices, systems, environments, and/or configurations, embodiments of eyebox adjustment for interpupillary distance are described in the context of the following example devices, systems, and methods.

Figure 1:
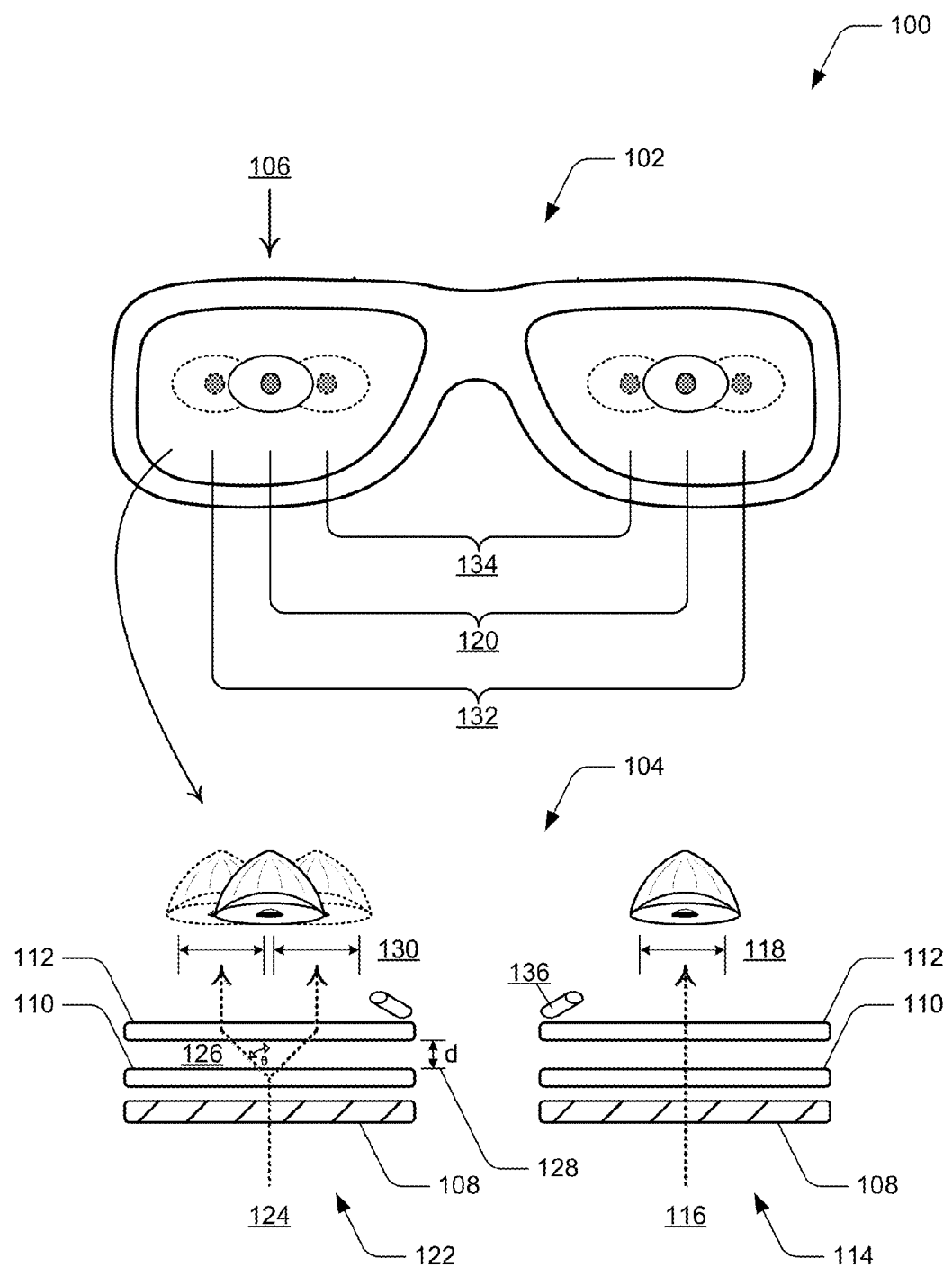
FIG. 1 illustrates an example system in which embodiments of eyebox adjustment for interpupillary distance can be implemented.

FIG. 1 illustrates an example system 100 in which various embodiments of eyebox adjustment for interpupillary distance can be implemented. An example wearable display device 102 includes left and right imaging systems, such as imaging systems 104 that are viewed from a perspective 106 of the wearable display device, as if viewing the imaging systems from the top of the device. In embodiments, the imaging systems 104 can be implemented as left and right display lens systems of the wearable display device described with reference to FIG. 3. A wearable display device can be implemented as any type of glasses or head-mounted display (HMD) that includes implementations of the imaging systems 104 (e.g., left and right display lens systems) through which a user can view the surrounding environment, yet also see virtual images that are generated for display and appear as a part of the environment. The wearable display device and/or a controller unit implements an imaging application, such as a software application, to implement embodiments of eyebox adjustment for interpupillary distance as described herein.

The imaging systems 104 include a display optic 108, such as a see-through and reflecting waveguide, through which light of an image (e.g., an image of the environment as viewed through the wearable display device) is projected to a first optical lens 110 and through to a second optical lens 112. For example, in the left imaging system 114, the light 116 is projected at a particular orientation through the waveguide optic 108 and through the optical lenses to a left eyebox 118 that approximately correlates to a position of a user's left eye. This example of the left imaging system 114 can be implemented for both the left and right imaging systems, and the projected orientation of the light approximately straight through the left and right imaging systems correlates to a mid-interpupillary distance 120 between the left and right eyes. In this example, the left and right eyeboxes are not laterally shifted when the first optical lens 110 projects the light of an image through at the projected orientation of the light. References to a left imaging system and a right imaging system, as described herein, correlate to a user's left and right eyes (e.g., from the perspective of wearing and looking through the wearable display device). Alternatively, the left and right imaging systems may be described from the perspective of looking at the wearable display device.

In an example of the right imaging system 122, the light 124 of the image is projected at a particular orientation through the waveguide optic 108 to the first optical lens 110. The projected orientation of the light in this example is approximately perpendicular to the waveguide optic. The first optical lens receives the light at the projected orientation and is implemented to then deviate the light of the image by a deviation angle 126 (theta) from the projected orientation of the light. The second optical lens 112 then receives the light of the image as projected from the first optical lens at the deviation angle, and the second optical lens is implemented to alter the deviated light back to the projected orientation for viewing the image. In this example, the light of the image is shown deviated in two directions, and the light of the image is laterally shifted based on the deviation angle 126 (theta) and a distance 128 between the first optical lens 110 and the second optical lens 112. Specifically, the amount of lateral shift can be determined or controlled by an equation d·tan·theta. For example, the lateral shift of the light to the left and/or right would be approximately 3.2 mm for an angle theta of 15° and a distance of 12 mm between the first and second optical lenses.

This example of the right imaging system 122 can be implemented for both the left and right imaging systems of the wearable display device 102. The projected orientation of the light 124 can be laterally shifted to direct the light at a right eyebox 130, shown laterally shifted both outward and inward from a middle position of the eyebox to approximately correlate to different positions of the user's right eye. The projected orientation of the light 124 can be laterally shifted through the imaging systems to correlate to a wide interpupillary distance 132 between the left and right eyes. Alternatively or in addition, the projected orientation of the light can be laterally shifted through the imaging systems to correlate to a narrow interpupillary distance 134 between the left and right eyes. The light of the image is laterally shifted to increase or decrease the distance between the left and right eyeboxes, and the distance between the left eyebox 118 and the right eyebox 130 approximately correlates to an interpupillary distance between the left and right eyes.

In implementations, the first and second optical lenses 110 and 112 of the imaging systems 104 can be implemented with transparent liquid crystal (LC) lenses. In an embodiment, the first optical lens 110 can be implemented for designated position settings, such as the wide, mid, and narrow distances between the left and right eyes. The designated position settings may also be termed large, medium, and small position settings, or by other designations. The first optical lens 110 of the imaging systems can be implemented with an LC Fresnel lens that is configured for on-off control, where the mid-interpupillary distance 120 is enabled when the optical lens is turned-off, and the wide and narrow interpupillary distances 132 and 134 are enabled when the optical lens is turned-on.

In other embodiments, the first and/or second optical lenses 110 and 112 of the imaging systems 104 can be implemented for variable adjustment (i.e., more than just the three settings). For example, an active prism technology may be utilized, such as switchable Bragg gratings (SBG), which can be implemented as very thin, active optical elements with switchable prisms. Additionally, the SBG active optical elements can be implemented as binary (on/off), or for continuously variable adjustment. In another embodiment, the line of sight between the first and second optical lenses 110 and 112 can be shifted with prism optical elements that laterally shift to vary the degree of the deviation angle 126 between the first and second optical lenses to offset the line of sight to correlate with the interpupillary distance between the left and right eyes. An example of this system is shown and described with reference to FIG. 2.

In another embodiment, the first optical lens 110 of the imaging systems 104 can be implemented for variable, adjusted position settings of the distance between the left and right eyeboxes to correlate with the interpupillary distance between the left and right eyes. In this example, the imaging systems 104 can each include an eye tracking camera 136 that images a location of the left and right eyes, and then the distance between the left and right eyeboxes is automatically adjusted based on the location of the left and right eyes. Alternatively, the distance between the left and right eyeboxes can be based on a user input of the interpupillary distance between the left and right eyes.

Figure 2:
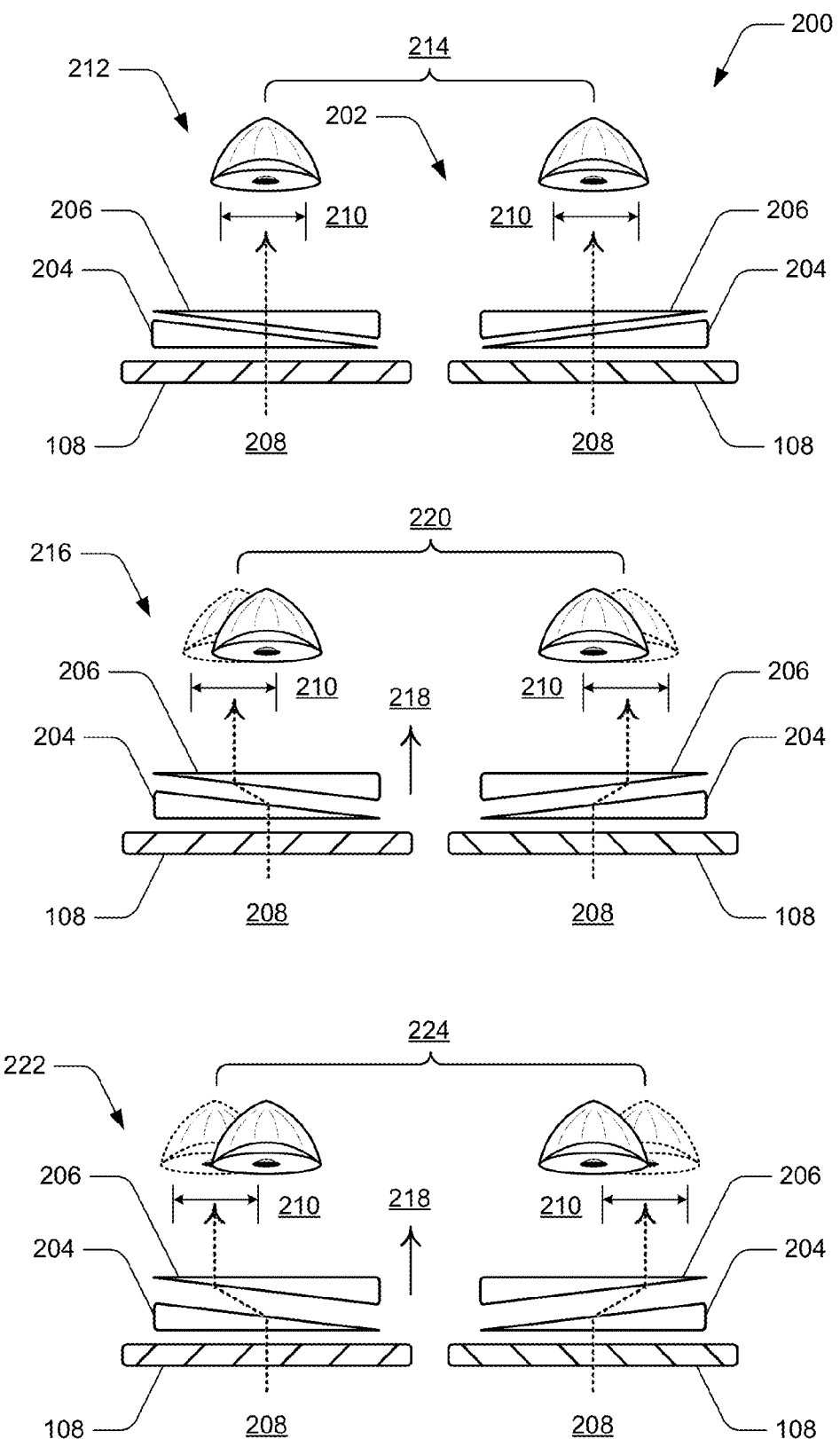
FIG. 2 illustrates another example system in which embodiments of eyebox adjustment for interpupillary distance can be implemented.

FIG. 2 illustrates another example system 200 in which various embodiments of eyebox adjustment for interpupillary distance can be implemented. The example system includes imaging systems 202 that can be implemented as left and right display lens systems of the wearable display device described with reference to FIG. 3. Similar to the imaging systems described with reference to FIG. 1, the imaging systems 202 include a display optic 108, such as a see-through and reflecting waveguide, through which light of an image is projected to a first prism optical element 204 and through to a second prism optical element 206. For example, the light 208 is projected at a particular orientation through the waveguide optic 108 and through the prism optical elements to an eyebox 210 that approximately correlates to a position of a user's eye (e.g., the user's left and right eyes). As shown at 212, the projected orientation of the light approximately straight through the left and right imaging systems correlates to an interpupillary distance 214 between the left and right eyes.

Continuing the example at 216, the prism optical elements 204 and 206 are offset in a direction 218 along the line of sight (e.g., relative to the configuration in the example shown at 212). Specifically, the second prism optical element 206 has been moved in the direction 218 to increase the spacing between the prism optical elements. Alternatively or in addition, the first prism optical element 204 may be moved relative to the second prism optical element 206 and/or both of the prism optical elements may be moved perpendicular to the line of sight. In another implementation, the second prism optical element 206 may be laterally shifted relative to the first prism optical element 204. Alternatively or in addition, first prism optical element 204 may be laterally shifted relative to the second prism optical element 206 and/or both of the prism optical elements may be laterally shifted.

The initial projected orientation of the light 208 in this example is approximately perpendicular to the waveguide optic 108. The first prism optical element 204 receives the light at the projected orientation and then deviates the light of the image by a deviation angle (theta) from the projected orientation of the light. The second prism optical element 206 then receives the light of the image as projected from the first prism optical element at the deviation angle, and the second prism optical element alters the deviated light back to the projected orientation for viewing the image. The altered orientation of the light through the left and right imaging systems correlates to an interpupillary distance 220 between the left and right eyes (which is wider than the interpupillary distance 214).

Continuing the example at 222, the prism optical elements 204 and 206 are further offset in the direction 218, relative to the configuration in the example shown at 216. The initial projected orientation of the light 208 in this example is approximately perpendicular to the waveguide optic 108. The first prism optical element 204 receives the light at the projected orientation and then deviates the light of the image by a larger deviation angle (theta) from the projected orientation of the light. The second prism optical element 206 then receives the light of the image as projected from the first prism optical element at the larger deviation angle, and the second prism optical element alters the deviated light back to the projected orientation for viewing the image. The altered orientation of the light through the left and right imaging systems correlates to an interpupillary distance 224 between the left and right eyes (which is wider than the interpupillary distances 214 and 220).

Figure 3:
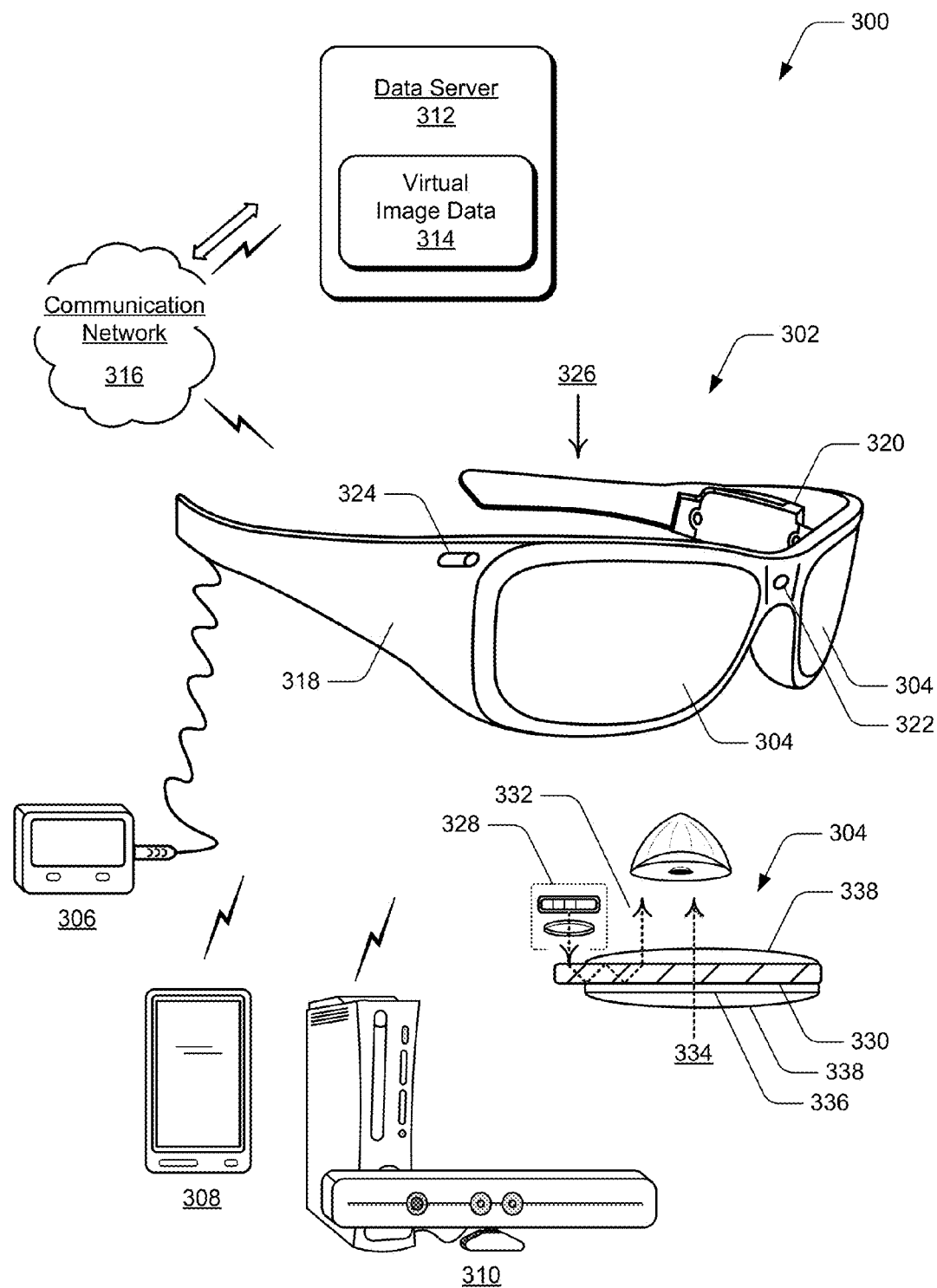
FIG. 3 illustrates an example system that includes an example of a wearable display device in which embodiments of eyebox adjustment for interpupillary distance can be implemented.

FIG. 3 illustrates an example system 300 that includes an example wearable display device 302 in which embodiments of eyebox adjustment for interpupillary distance can be implemented. The wearable display device can be implemented as any type of glasses or head-mounted display (HMD) that includes display lens systems 304 (e.g., left and right display lens systems) through which a user can view the surrounding environment, yet also see virtual images (e.g., any type of object, video, text, graphic, and the like) that are generated for display and appear as a part of the environment.

The wearable display device 302 can be implemented as an independent, portable system that includes memory, software, a processor, and/or a power source. Alternatively or in addition, the wearable display device may be communicatively linked to a controller 306 that includes any one or combination of the memory, software, processor, and/or power source, such as a battery unit. The controller can be implemented for wired or wireless communication with the wearable display device. The controller and/or the wearable display device can also be implemented with any number and combination of differing components as further described with reference to the example device shown in FIG. 6. For example, the controller and/or the wearable display device includes an imaging application implemented as computer-executable instructions, such as a software application, and executed by a processor to implement embodiments of eyebox adjustment for interpupillary distance as described herein.

In embodiments, the controller may be implemented as a dedicated device (e.g., the wired controller 306), as a mobile phone 308, a tablet or other portable computer device, a gaming system 310, or as any other type of electronic device that can be implemented to process and generate virtual images for display as part of the environment that is viewed through the display lens system of the wearable display device. The controller may communicate with the wearable display device wirelessly via WiFi™, Bluetooth™, infrared (IR), RFID transmission, wireless Universal Serial Bus (WUSB), cellular, or via other wireless communication techniques.

The example system 300 also includes a data server 312, or data service, that communicates, or otherwise distributes, virtual image data 314 to the wearable display device 302 via a communication network 316. For example, the data server may be part of a network-based gaming system that generates virtual images for augmented reality display at the wearable display device. Alternatively, the data server may be part of a navigation system that communicates navigation directions and information for display in the display lens systems 304 of the wearable display device. In another example, the data server may be part of a messaging service, such as an e-mail or text messaging system, that communicates e-mail and/or text messages to the wearable display device for display in the display lens systems, where a user can read a message as an augmented reality image that is displayed over the environment viewed through the wearable display device.

Any of the devices, servers, and/or services can communicate via the communication network 316, which may be implemented to include wired and/or wireless networks. The communication network can also be implemented using any type of network topology and/or communication protocol, and can be represented or otherwise implemented as a combination of two or more networks, to include IP-based networks and/or the Internet. The communication network may also include mobile operator networks that are managed by mobile operators, such as a communication service provider, cell-phone provider, and/or Internet service provider.

The wearable display device 302 includes a frame 318, such as in the form of glasses, goggles, or any other structure, that supports and incorporates the various components of the device, as well as serves as a conduit for electrical and other component connections. A components module 320 (or components modules on the left, right, and/or both sides of the device frame) incorporates any of the various components, such as processing and control circuitry, memory, software, a processor, GPS transceiver, and/or power source. The wearable display device may also include a microphone 322 to record audio data from the surrounding environment, as well as ear phones for audio feedback as part of an augmented reality experience.

The wearable display device 302 also includes various cameras 324 that capture video and still images of the surrounding environment. The image and video data can be processed on the device and/or by a controller device (e.g., controller 306), and used to create a mapping field to orient and track a user in the environment space. The wearable display device can also include eye tracking cameras used to determine a user's eyeball location and track eye movements. The wearable display device may also include a temperature sensor, as well as inertial sensors for sensing position, orientation, and acceleration of the wearable display device.

An example of one display lens system 304 is shown from a viewer perspective 326 of the wearable display device 302, as if viewing the display lens system from the top of the device. The display lens system includes an imaging system 328, which can be implemented with any number of micro display panels, lenses, and reflecting elements to display and project a virtual image into a see-through and reflecting waveguide 330. A display lens system 304 can be implemented as any of the imaging systems described with reference to FIGS. 1 and 2 to implement embodiments of eyebox adjustment for interpupillary distance. The see-through, reflecting waveguide 330 is implemented for internal reflection and conducts the visible light 332 of a virtual image that is generated by the imaging unit for viewing by a user, and also passes through the light 334 from the surrounding environment for viewing by the user.

The micro display panels, lenses, and/or reflecting elements of the imaging system 328 can be implemented with various display technologies, such as implemented with a transparent LCD, or using a transmissive projection technology where the light source is modulated by optically active material, backlit with white light. These technologies can be implemented using LCD type displays with powerful backlights and high optical energy densities. Alternatively, a micro display and/or reflecting element can be implemented using a reflective technology, such as digital light processing (DLP) and liquid crystal on silicon (LCOS), that reflects external light, which is reflected and modulated by an optical material.

In embodiments, the imaging system 328 (or other components of a display lens system 304) can be implemented to include an infra-red (IR) laser utilized for system calibrations and/or as an illumination source for an eye-tracking system and camera that tracks the position of a user's eyes. The eye-tracking system includes the eye-tracking illumination source, which is not a visible light, and includes an eye-tracking IR sensor. The IR sensor can be implemented as an IR camera that provides infrared image data of the eye for eye-tracking processing, or an IR sensor that detects eye reflections when the eye is illuminated. The see-through and reflecting waveguide 330 can also be utilized for the infrared illumination, and for eyeball reflections that the eye-tracking system uses to track the position of the user's eyes.

In this example, the display lens systems 304 include an optional opacity filter 336, and a see-through lens 338 on each side of the waveguide 330. The see-through lenses can be standard eye-glass lenses and made to prescription (or no prescription). The opacity filter selectively blocks natural light, either uniformly or on a per-pixel basis, from passing through the see-through and reflecting waveguide to enhance the contrast of a displayed virtual image.

Example methods 400 and 500 are described with reference to respective FIGS. 4 and 5 in accordance with one or more embodiments of eyebox adjustment for interpupillary distance. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 4:
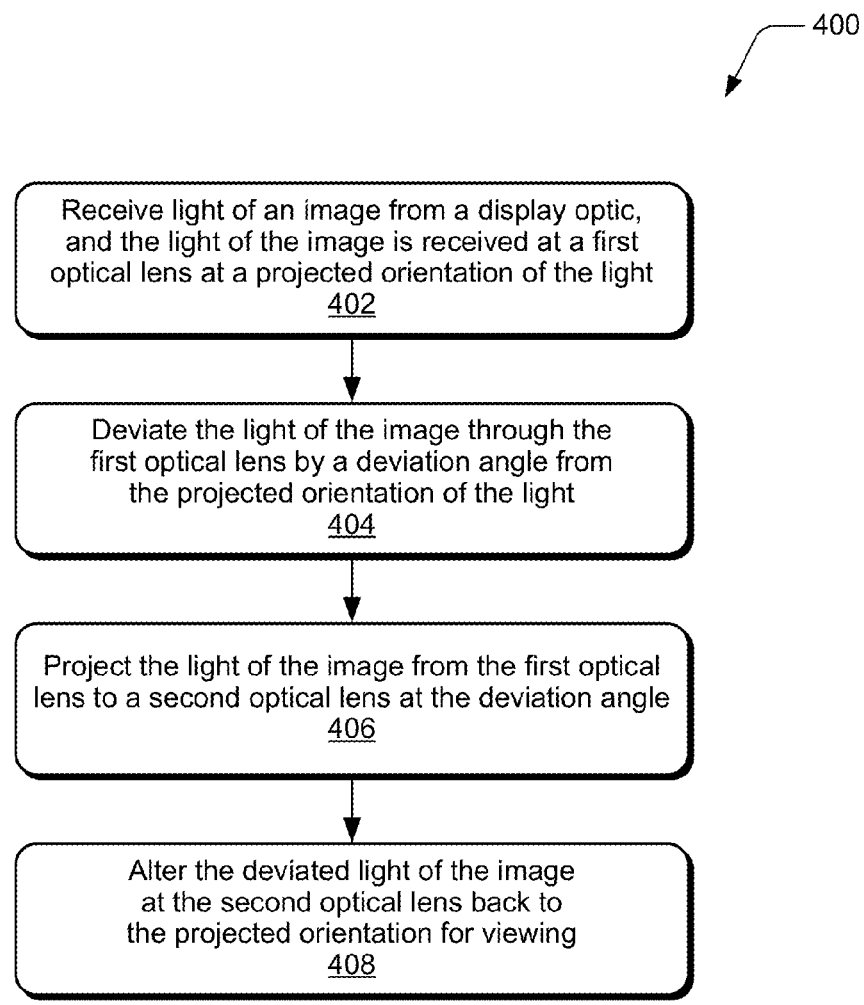
FIG. 4 illustrates example method(s) of eyebox adjustment for interpupillary distance in accordance with one or more embodiments.

FIG. 4 illustrates example method(s) 400 of eyebox adjustment for interpupillary distance. The order in which the method blocks are described are not intended to be construed as a limitation, and any number of the described method blocks can be combined in any order to implement a method, or an alternate method.

At block 402, light of an image is received from a display optic, and the light of the image is received at a first optical lens at a projected orientation of the light. For example, the first optical lens 110 of the imaging systems 104 (FIG. 1) receives the light 124 of an image (e.g., an image of the environment as viewed through the wearable display device 102) at a projected orientation of the light, which is approximately perpendicular to the waveguide optic 108.

At block 404, the light of the image is deviated through the first optical lens by a deviation angle from the projected orientation of the light. For example, the first optical lens 110 of the imaging systems 104 deviates the light 124 by the deviation angle 126 (theta) from the projected orientation of the light. The light can be laterally-shifted to increase or decrease a distance between the left eyebox 118 and the right eyebox 130. The left and right eyeboxes each align with respective left and right eyes that view the image, and the distance between the left and right eyeboxes approximately correlates to an interpupillary distance between the left and right eyes. The light 124 of the image is laterally shifted based on the deviation angle 126 and a distance 128 between the first optical lens 110 and the second optical lens 112.

At block 406, the light of the image is projected from the first optical lens to a second optical lens at the deviation angle. For example, the first optical lens 110 of the imaging systems 104 projects the light to the second optical lens 112 at the deviation angle 126. At block 308, the deviated light of the image is altered at the second optical lens back to the projected orientation for viewing. For example, the second optical lens 112 of the imaging systems 104 receives the light 124 of the image as projected from the first optical lens 110 at the deviation angle, and then alters the deviated light back to the projected orientation for viewing the image.

Figure 5:
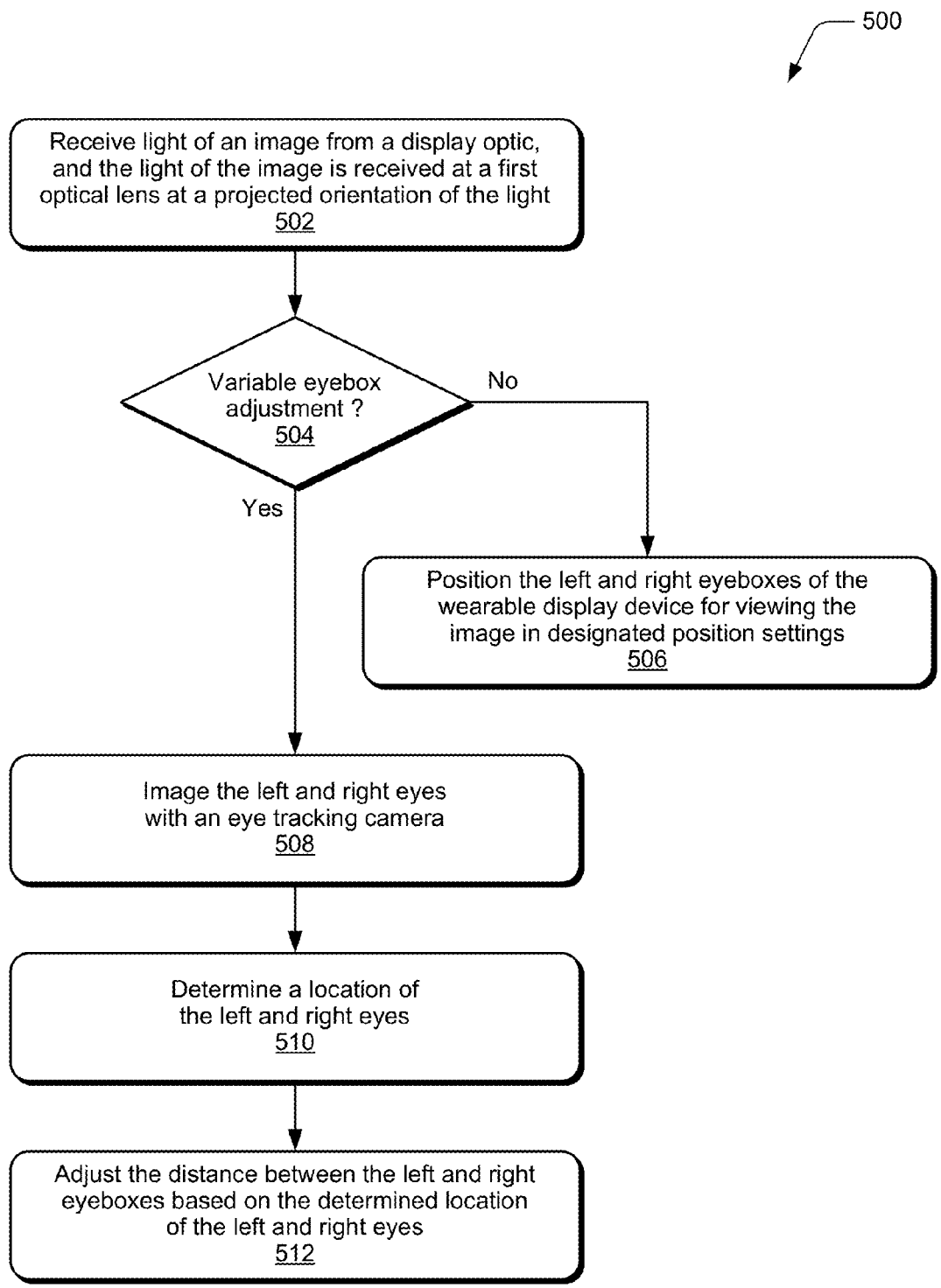
FIG. 5 illustrates example method(s) of eyebox adjustment for interpupillary distance in accordance with one or more embodiments.

FIG. 5 illustrates example method(s) 500 of eyebox adjustment for interpupillary distance. The order in which the method blocks are described are not intended to be construed as a limitation, and any number of the described method blocks can be combined in any order to implement a method, or an alternate method.

At block 502, light of an image is received from a display optic, and the light of the image is received at a first optical lens at a projected orientation of the light. For example, the first optical lens 110 of the imaging systems 104 (FIG. 1) receives the light 124 of an image (e.g., an image of the environment as viewed through the wearable display device 102) at a projected orientation of the light, which is approximately perpendicular to the waveguide optic 108.

At block 504, a determination is made as to whether eyebox adjustment for a wearable display device is variable. For example, the first optical lens 110 of the imaging systems 104 (FIG. 1) for the wearable display device 102 can be implemented for variable, adjusted position settings of the distance between the left and right eyeboxes to correlate with the interpupillary distance between the left and right eyes.

If the eyebox adjustment is not variable (i.e., no from block 504), then at block 506, the left and right eyeboxes of the wearable display device are positioned for viewing the image in designated position settings. For example, the light 124 of the image is laterally shifted to increase or decrease the distance between the left and right eyeboxes, and the distance between the left eyebox 118 and the right eyebox 130 approximately correlates to an interpupillary distance between the left and right eyes. The first optical lens 110 is implemented for designated position settings, such as the wide interpupillary distance 132, mid-interpupillary distance 120, and narrow interpupillary distance 134 between the left and right eyes. The first optical lens 110 can be implemented for on-off control, where the mid-interpupillary distance 120 is enabled when the optical lens is turned-off, and the wide and narrow interpupillary distances 132 and 134 are enabled when the optical lens is turned-on.

If the eyebox adjustment is variable (i.e., yes from block 504), then the distance between the left and right eyeboxes of the wearable display device 102 is variable to correlate with the interpupillary distance between the left and right eyes. At block 508, the left and right eyes are imaged with an eye tracking camera. For example, the imaging systems 104 each include an eye tracking camera 136 that images a location of the left and right eyes. At block 510, a location of the left and right eyes is determined. For example, the imaging application 620 determines the location of the left and right eyes, either from the eye tracking camera images, or based on a user input of the interpupillary distance between the left and right eyes.

At block 512, the distance between the left and right eyeboxes is adjusted based on the determined location of the left and right eyes. For example, the imaging application 620 automatically adjusts the distance between the left and right eyeboxes of the wearable display device by controlling the angle 126 (theta). The first optical lens 110 of the imaging systems 104 deviates the light 124 by the deviation angle 126 (theta) from the projected orientation of the light. The light is laterally-shifted to increase or decrease a distance between the left eyebox 118 and the right eyebox 130, and the left and right eyeboxes each align with the respective left and right eyes. The light of the image is then projected from the first optical lens 110 to the second optical lens 112 at the deviation angle 126, and the deviated light is altered at the second optical lens back to the projected orientation for viewing.

Figure 6:
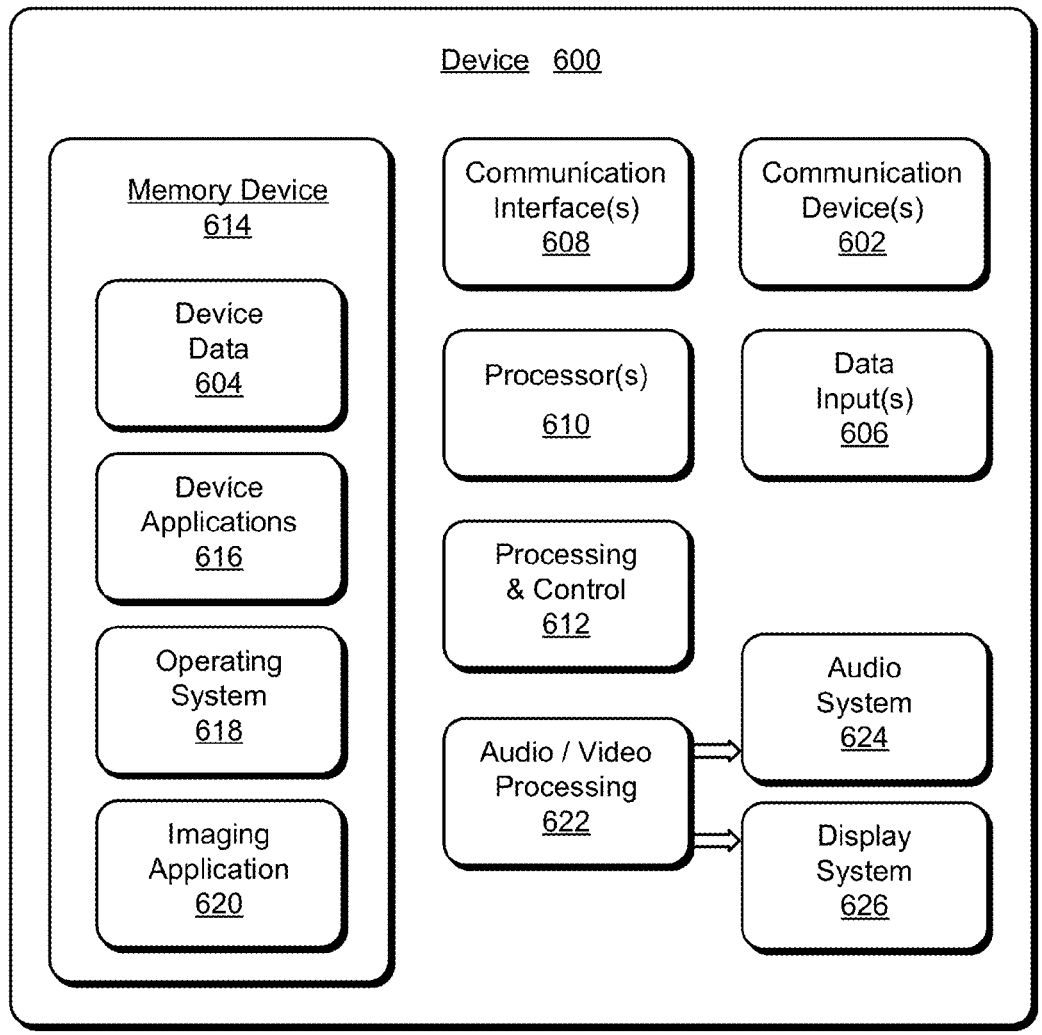
FIG. 6 illustrates various components of an example device that can implement embodiments of eyebox adjustment for interpupillary distance.

FIG. 6 illustrates various components of an example device 600 that can be implemented as any of the devices described with reference to the previous FIGS. 1-5, such as a wearable display device and/or a controller for a wearable display device. In embodiments, the device may be implemented as any one or combination of a fixed or mobile device, in any form of a consumer, computer, portable, communication, phone, navigation, appliance, gaming, media playback, and/or electronic device. The device may also be associated with a user (i.e., a person) and/or an entity that operates the device such that a device describes logical devices that include users, software, firmware, hardware, and/or a combination of devices.

The device 600 includes communication devices 602 that enable wired and/or wireless communication of device data 604, such as virtual image data, as well as video and images data, and other media content stored on the device. The media content stored on the device can include any type of audio, video, and/or image data. The device includes one or more data inputs 606 via which any type of data, media content, and/or inputs can be received, such as user-selectable inputs and any other type of audio, video, and/or image data received from any content and/or data source.

The device 600 also includes communication interfaces 608, such as any one or more of a serial, parallel, network, or wireless interface. The communication interfaces provide a connection and/or communication links between the device and a communication network by which other electronic, computing, and communication devices communicate data with the device.

The device 600 includes one or more processors 610 (e.g., any of microprocessors, controllers, and the like), which process computer-executable instructions to control the operation of the device. Alternatively or in addition, the device can be implemented with any one or combination of software, hardware, firmware, or fixed logic circuitry that is implemented in connection with processing and control circuits which are generally identified at 612. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 also includes one or more memory devices 614 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 614 provides data storage mechanisms to store the device data 604, other types of information and/or data, and device applications 616. For example, an operating system 618 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications also include an imaging application 620 that implements embodiments of eyebox adjustment for interpupillary distance as described herein.

The device 600 may also include an audio and/or video processing system 622 that generates audio data for an audio system 624 and/or generates display data for a display system 626. In implementations, the audio system and/or the display system are external components to the device. Alternatively, the audio system and/or the display system are integrated components of the example device.

Although embodiments of eyebox adjustment for interpupillary distance have been described in language specific to features and/or methods, the appended claims are not necessarily limited to the specific features or methods described. Rather, the specific features and methods are disclosed as example implementations of eyebox adjustment for interpupillary distance.

The invention claimed is:

1. A system, comprising:
left optical lenses configured to receive light of an image for viewing with a left eye, the left optical lenses including a first left optical lens and a second left optical lens, the first left optical lens configured to deviate the light of the image by a first deviation angle;
right optical lenses configured to receive the light of the image for viewing with a right eye, the right optical lenses including a first right optical lens and a second right optical lens, the first right optical lens configured to deviate the light of the image by a second deviation angle; and
a left eyebox and a right eyebox each configured to align with the respective left and right eyes that view the image, the left and right optical lenses configured to laterally shift the light of the image based in part on the first and second deviation angles to increase or decrease a distance between the left and right eyeboxes.

2. The system as recited in claim 1, wherein the distance between the left eyebox and the right eyebox approximately correlates to an interpupillary distance between the left and right eyes.

3. The system as recited in claim 2, further comprising variable position settings of the distance between the left and right eyeboxes to correlate with the interpupillary distance between the left and right eyes.

4. The system as recited in claim 3, wherein the distance between the left and right eyeboxes is based on a user input of the interpupillary distance between the left and right eyes.

5. The system as recited in claim 1, wherein:
the first left optical lens is configured to receive the light of the image from a display optic at a projected orientation of the light, and deviate the light by the first deviation angle;
the first right optical lens is configured to receive the light of the image from the display optic at the projected orientation of the light, and deviate the light by the second deviation angle;
the second left optical lens is configured to receive the deviated light of the image from the first left optical lens at the first deviation angle and alter the deviated light back to the projected orientation of the light;
the second right optical lens is configured to receive the deviated light of the image from the first right optical lens at the second deviation angle and alter the deviated light back to the projected orientation of the light;
the light of the image is laterally shifted exiting the second left optical lens based on the first deviation angle and a distance between the first left optical lens and the second left optical lens; and
the light of the image is laterally shifted exiting the second right optical lens based on the second deviation angle and the distance between the first right optical lens and the second right optical lens.

6. The system as recited in claim 5, further comprising position settings of the left and right eyeboxes for viewing the image, the position settings including:
a first position with the distance between the left and right eyeboxes increased to correlate to a wide interpupillary distance between the left and right eyes;
a second position with the distance between the left and right eyeboxes not laterally shifted when the first optical lens projects the light of the image through at the projected orientation of the light; and
a third position with the distance between the left and right eyeboxes decreased to correlate to a narrow interpupillary distance between the left and right eyes.

7. The system as recited in claim 6, wherein the first optical lens is configured for on-off control, the first and third positions enabled when the first optical lens is turned-on, and the second position enabled when the first optical lens is turned-off.

8. The system as recited in claim 1, further comprising an eye-tracking camera configured to image a location of the left and right eyes, and wherein the distance between the left and right eyeboxes is adjusted based on the location of the left and right eyes.

9. A method, comprising:
receiving light of an image for viewing in a left display lens system and in a right display lens system;
deviating the light of the image through a first left optical lens of the left display lens system by a first deviation angle and through a first right optical lens of the right display lens system by a second deviation angle; and
laterally-shifting the light of the image in at least one of the left display lens system and the right display lens system based in part on the first and second deviation angles to increase or decrease a distance between a left eyebox and a right eyebox.

10. The method as recited in claim 9, wherein the left and right eyeboxes each align with respective left and right eyes that view the image, and wherein the distance between the left and right eyeboxes approximately correlates to an interpupillary distance between the left and right eyes.

11. The method as recited in claim 10, wherein the distance between the left and right eyeboxes is variable to correlate with the interpupillary distance between the left and right eyes.

12. The method as recited in claim 11, further comprising:
    imaging the left and right eyes with an eye-tracking camera;
    determining a location of the left and right eyes; and
    adjusting the distance between the left and right eyeboxes based on the determined location of the left and right eyes.

13. The method as recited in claim 9, wherein the left display lens system further includes a second left optical lens and the right display lens system further includes a second right optical lens, the method further comprising:
    receiving the light of the image at the first left optical lens and the first right optical lens at a projected orientation of the light;
    deviating the light through the first left optical lens by the first deviation angle for the left display lens system and through the first right optical lens by the second deviation angle for the right display lens system from the projected orientation of the light;
    projecting the deviated light from the first left optical lens to the second left optical lens at the first deviation angle for the left display lens system;
    projecting the deviated light from the first right optical lens to the second right optical lens at the second deviation angle for the right display lens system;
    altering the deviated light received from the first left optical lens at the second left optical lens back to the projected orientation for viewing the image;
    altering the deviated light received from the first right optical lens at the second right optical lens back to the projected orientation for viewing the image; wherein
    the light of the image is laterally shifted exiting the second left optical lens of the left display lens system based on the first deviation angle and a distance between the first left optical lens and the second left optical lens; and
    the light of the image is laterally shifted exiting the second right optical lens of the right display lens system based on the second deviation angle and the distance between the first right optical lens and the second right optical lens.

14. The method as recited in claim 13, further comprising positioning the left and right eyeboxes for viewing the image, wherein position settings include:
    a first position with the distance between left and right eyeboxes increased to correlate to a wide interpupillary distance between the left and right eyes;
    a second position with the distance between the left and right eyeboxes not laterally shifted when the first optical lens projects the light of the image through at the projected orientation of the light; and
    a third position with the distance between the left and right eyeboxes decreased to correlate to a narrow interpupillary distance between the left and right eyes.

15. The method as recited in claim 14, wherein the first optical lens is configured for on-off control, the first and third positions enabled when the first optical lens is turned-on, and the second position enabled when the first optical lens is turned-off.

16. A wearable display device, comprising:
    a left display lens system configured to form an image for viewing with a left eye, the left display lens system including at least a first left optical lens configured to deviate light of the image by a first deviation angle;
    a right display lens system configured to form the image for viewing with a right eye, the right display lens system including at least a first right optical lens configured to deviate light of the image by a second deviation angle; and
    a left eyebox of the left display lens system and a right eyebox of the right display lens system, at least one of the left display lens system and the right display lens system configured to laterally shift light of the image based in part on the first and second deviation angles to increase or decrease a distance between the left and right eyeboxes.

17. The wearable display device as recited in claim 16, wherein:
    the left eyebox of the left display lens system is configured to align with the left eye that views the image; and
    the right eyebox of the right display lens system is configured to align with the right eye that views the image, wherein the distance between the left and right eyeboxes approximately correlates to an interpupillary distance between the left and right eyes.

18. The wearable display device as recited in claim 17, further comprising variable position settings of the distance between the left and right eyeboxes to correlate with the interpupillary distance between the left and right eyes.

19. The wearable display device as recited in claim 16, wherein the left display lens system further includes a second left optical lens and the right display lens system further includes a second right optical lens, and where:
    the first left optical lens and the first right optical lens are configured to receive the light of the image at a projected orientation of the light, and deviate the light by the first deviation angle for the left display lens system and by the second deviation angle for the right display lens system from the projected orientation of the light;
    the second left optical lens is configured to receive the deviated light of the image from the first left optical lens at the first deviation angle for the left display lens system, and alter the deviated light back to the projected orientation of the light for viewing the image;
    the second right optical lens configured to receive the deviated light of the image from the first right optical lens at the second deviation angle for the right display lens system, and alter the deviated light back to the projected orientation of the light for viewing the image; wherein
    the light of the image is laterally shifted exiting the second left optical lens in the left display lens system based on the first deviation angle and a distance between the first left optical lens and the second left optical lens; and
    the light of the image is laterally shifted exiting the second right optical lens in the right display lens system based on the second deviation angle and the distance between the first right optical lens and the second right optical lens.

20. The wearable display device as recited in claim 19, further comprising position settings of the left and right eyeboxes for viewing the image, the position settings including:
    a first position with the distance between the left and right eyeboxes increased to correlate to a wide interpupillary distance between the left and right eyes;
    a second position with the distance between the left and right eyeboxes not laterally shifted when the first optical lens projects the light of the image through at the projected orientation of the light; and a third position with the distance between the left and right eyeboxes decreased to correlate to a narrow interpupillary distance between the left and right eyes.

* * * * *